United States Patent
Joss et al.

(10) Patent No.: US 11,344,838 B2
(45) Date of Patent: May 31, 2022

(54) TEMPERATURE-SWING ADSOROPTION PROCESS

(71) Applicant: CASALE SA, Lugano (CH)

(72) Inventors: Lisa Joss, Manchester (GB); Max Hefti, Zurich (CH); Marco Mazzotti, Zurich (CH)

(73) Assignee: CASALE SA, Lugano (CH)

(*) Notice: Subject to any disclaimer, the term of this patent is extended or adjusted under 35 U.S.C. 154(b) by 280 days.

(21) Appl. No.: 16/642,129

(22) PCT Filed: Aug. 9, 2018

(86) PCT No.: PCT/EP2018/071600
§ 371 (c)(1),
(2) Date: Feb. 26, 2020

(87) PCT Pub. No.: WO2019/042734
PCT Pub. Date: Mar. 7, 2019

(65) Prior Publication Data
US 2020/0298171 A1 Sep. 24, 2020

(30) Foreign Application Priority Data
Aug. 28, 2017 (EP) .................................. 17188074

(51) Int. Cl.
*B01D 53/04* (2006.01)
(52) U.S. Cl.
CPC .... *B01D 53/0462* (2013.01); *B01D 2253/108* (2013.01); *B01D 2256/10* (2013.01);
(Continued)

(58) Field of Classification Search
CPC ................ B01D 53/04; B01D 53/0462; B01D 2253/108; B01D 2256/10; B01D 2257/80;
(Continued)

(56) References Cited

U.S. PATENT DOCUMENTS

| 5,958,109 A | 9/1999 | Fuderer |
| 8,591,627 B2 | 11/2013 | Jain |

(Continued)

OTHER PUBLICATIONS

International Preliminary Report on Patenability from International Application No. PCT/EP2018/071600 completed Nov. 29, 2019.
(Continued)

*Primary Examiner* — Frank M Lawrence, Jr.
(74) *Attorney, Agent, or Firm* — Dorsey & Whitney LLP

(57) ABSTRACT

A temperature swing adsorption process for removing a target component from a gaseous mixture containing water and at least one side component, said process comprising: (a) at least one adsorption step, providing a target component-loaded adsorbent and at least one waste stream depleted of the target component; (b) a desorption step, comprising heating of the loaded adsorbent to a desorption temperature and providing a first output stream containing the desorbed target component; (c) a conditioning step; (d) at least one target component-releasing releasing step bringing the solid adsorbent to a temperature lower than said desorption temperature and providing at least one second output stream containing an amount of the target component and containing water; (e) separating water from said second output stream(s) and (f) subjecting the so obtained water-depleted stream(s) to said adsorption step or to at least one of said adsorption steps.

22 Claims, 5 Drawing Sheets

(52) U.S. Cl.
CPC .... *B01D 2257/504* (2013.01); *B01D 2257/80* (2013.01); *B01D 2259/402* (2013.01); *B01D 2259/40052* (2013.01); *B01D 2259/40064* (2013.01)

(58) Field of Classification Search
CPC ...... B01D 2257/504; B01D 2258/0283; B01D 2259/40045; B01D 2259/40052; B01D 2259/40062; B01D 2259/40064; B01D 2259/40066; B01D 2259/402; B01D 2259/403; Y02C 20/40
USPC .................................. 95/114, 115, 139, 148
See application file for complete search history.

(56) References Cited

U.S. PATENT DOCUMENTS

| | | | |
|---|---|---|---|
| 9,138,719 B1 | 9/2015 | Eddaoudi et al. | |
| 11,034,903 B2 * | 6/2021 | Doong | C10L 3/106 |
| 2005/0229784 A1 * | 10/2005 | Thomas | C10L 3/10 |
| | | | 95/188 |
| 2006/0204419 A1 * | 9/2006 | Thomas | C10L 3/10 |
| | | | 423/210 |
| 2013/0192299 A1 * | 8/2013 | Dolan | C10L 3/101 |
| | | | 62/636 |
| 2014/0224118 A1 * | 8/2014 | Zhou | C10L 3/106 |
| | | | 95/8 |
| 2014/0326136 A1 | 11/2014 | Doong et al. | |
| 2015/0068397 A1 | 3/2015 | Boulet et al. | |
| 2019/0030479 A1 * | 1/2019 | Joss | B01D 53/0462 |

OTHER PUBLICATIONS

International Search Report from International Application No. PCT/EP2018/071600 dated Sep. 7, 2018.

* cited by examiner

TEMPERATURE-SWING ADSOROPTION PROCESS

FIELD OF THE INVENTION

The present invention relates to a process for separating a target component from a humid gaseous mixture containing one or more side components. In particular, the present invention relates to a process involving temperature-swing adsorption of said target component on a solid adsorbent.

PRIOR ART

The separation of a target component contained in a gaseous mixture is of notable importance in several fields, e.g. chemicals, fuels, food, power production. It can be desirable for environmental concerns and/or for use of such target component as raw material in an industrial process.

The separation of a target component from a multi-component gaseous mixture can be essentially performed via chemical scrubbing, wherein the gaseous mixture is contacted with a liquid solution containing a compound suitable for selectively removing said target component, or via selective adsorption on solid adsorbent. The latter has several advantages over the former, for example less regeneration consumption, no solvent emissions in the atmosphere and less corrosion problems.

An adsorption process for the separation of a target component from at least one side component in a gaseous mixture is temperature swing adsorption (TSA). This process requires alternate phases of heating and cooling of the solid adsorbent in order to carry out the adsorption and regeneration (desorption), respectively.

There are several commercial applications of TSA processes. Reference is made below to a TSA process used for the capture of carbon dioxide ($CO_2$) from flue gas containing nitrogen, water vapour and impurities (e.g. argon, oxygen) as side components. Said application is taken as a non-limiting example.

The presence of water may negatively affect the performances of such TSA process and be detrimental to the adsorption of $CO_2$. Water is adsorbed more strongly than $CO_2$ over certain adsorbents used for $CO_2$ adsorption at flue gas conditions (e.g. 13X zeolite), whereas N2 and impurities (Ar, O2) typically adsorb less than $CO_2$, thus making $CO_2$ an intermediate component. As a consequence, the productivity decreases. Productivity is defined as the recovered amount of $CO_2$ per unit of mass or volume of the adsorbent and per unit of time.

Different methods may be used for removal of water.

According to a first method, the flue gas is subjected to dehydration before contacting the adsorbent. An example is disclosed in U.S. Pat. No. 8,591,627. However, dehydration must be carried out in an additional apparatus (i.e. a dryer), involving additional costs. Furthermore, the step of dehydration entails high consumption of mechanical and thermal energy. Another drawback is that the dryer may also adsorb some $CO_2$, thus causing a $CO_2$ loss during the regeneration of the dryer itself.

According to another method, the TSA process is carried out on a solid adsorbent comprising superimposed layers of different adsorbent materials, in particular comprising a first layer of a first material suitable for selectively adsorbing water and a second layer of a second material suitable for selectively adsorbing the target component. Hence, water is removed over the first material and the target component is removed over the second material. Said materials are preferably regenerated in the same temperature range.

Alternatively, an adsorbent is used which is selective for adsorption of the target component over the side component(s) and also over water. Examples of such adsorbents are certain metal organic materials (MOMs), such as those indicated in U.S. Pat. No. 9,138,719 B1. However, said adsorbent materials are uncommon and very expensive.

US 2014/0326136 discloses TSA systems and methods for purifying fluids using the same.

SUMMARY OF THE INVENTION

The invention aims to overcome the drawbacks of the prior art. In greater detail, the invention aims to provide a temperature swing adsorption process which is able to process both dry and wet feeds, to achieve high purity and high recovery while limiting the energy consumption and the complexity of the relative plant, and which can be performed over common adsorbent materials with affinity for water and $CO_2$.

This aim is reached with a temperature swing adsorption process for removing a target component from a gaseous mixture containing water and at least one side component, according to claim 1.

Said process comprises:

(a) at least one adsorption step, comprising adsorption of target component over a solid adsorbent, providing a target component-loaded adsorbent and at least one waste stream depleted of the target component;

(b) a desorption step, comprising heating of said target component-loaded adsorbent to a desorption temperature ($T_{des}$) and desorption of an amount of target component, providing an at least partially regenerated adsorbent and a first output stream containing the desorbed target component;

(c) a conditioning step, comprising cooling of said at least partially regenerated adsorbent to a conditioning temperature ($T_{con}$), and is characterized by:

(d) at least one target component-releasing step which brings the solid adsorbent to a temperature lower than said desorption temperature ($T_{des}$), providing at least one second output stream containing an amount of the target component and containing water, (e) separating water from said second output stream(s), producing at least one water-depleted stream, and (f) subjecting said water-depleted stream(s) to said adsorption step or at least one of said adsorption steps.

Said at least one target component-releasing step (d) is performed before or after said desorption step (b).

Said process may comprise one or more adsorption steps, each providing one waste stream depleted of the target component. In some embodiments, the process comprises a single adsorption step and only one waste stream is provided. In other embodiments, the process comprises a plurality of adsorption steps and a plurality of waste streams is provided.

The process may comprise one or more target-component releasing steps, each providing one second output stream. In some embodiments, the process comprises a single target-component releasing step and only one output stream is provided. In other embodiments, the process comprises a plurality of target-component releasing steps and a plurality of output streams is provided. As a consequence, according to the number of said second output streams, one or more water-depleted streams are produced.

In some embodiments, the process comprises only one adsorption step and said water-depleted stream or at least one of said water-depleted streams is subjected to said adsorption step. In other embodiments, the process comprises a plurality of adsorption steps and said water-depleted stream or at least one of said water-depleted streams is subjected to at least one of them. According to some embodiments, more than one water-depleted streams are produced and, preferably, each one is subjected to an adsorption step.

According to a preferred embodiment, said step (e) comprises cooling of said second output stream(s) to condense at least a portion of the water contained therein and also comprises separation of the condensed water, thus obtaining said water-depleted stream(s).

In a first embodiment, said target-component releasing step or at least one of said target-component releasing steps is performed before the desorption step (b) and comprises heating of the target component-loaded adsorbent up to a temperature which is lower than said desorption temperature ($T_{des}$). According to said embodiment, the target component is released by desorption.

In a second embodiment, said target-component releasing step or at least one of said target-component releasing steps is performed after the desorption step (b) with the aid of at least a portion of said waste stream or at least one of said waste streams. Preferably, said waste stream or at least one of said waste streams is entirely or substantially entirely used for said step.

Preferably, according to said second embodiment, the target component releasing step comprises cooling of said at least partially regenerated adsorbent, preferably to a temperature higher than said conditioning temperature ($T_{con}$), said cooling taking place with the aid of at least a portion of said waste stream or at least one of said waste streams, which is optionally cooled prior to be subjected to said step (d).

According to this second embodiment, the target component is released by displacement of non-adsorbed target component by means of the at least one side-component contained in the waste stream or at least one of said waste streams. The target component may also be partially released by desorption of an amount of target component not previously desorbed during the desorption step (b).

The process of the invention may comprise more than one of said target-component releasing steps, wherein one of them is performed before said desorption step (b) and another one is performed thereafter with the aid of at least a portion of said waste stream or at least one of said waste streams, which is optionally cooled prior to be subjected thereto. For example, the process of the invention comprises two target component-releasing steps.

According to a particularly preferred embodiment, said process is carried out in a plurality of reactors containing an adsorbent or multiple layers of adsorbents and each reactor performing the above mentioned steps (a) to (f). Said adsorbent is preferably a fixed bed adsorbent.

Preferably, said water-depleted stream or at least one of said water-depleted streams provided by one reactor is subjected to at least one other reactor of the plurality while performing said adsorption step or one of said adsorption steps.

Said water-depleted stream or at least one of said water-depleted streams provided by one reactor may be subjected with or without an intermediate storage in a suitable tank to said at least one other reactor performing said adsorption step or one of said adsorption steps.

According to some embodiments, the desorption step (b) comprises direct heat exchange with a heating medium in contact with the adsorbent. Accordingly, all or some of the heat transferred in the desorption step (b) is transferred by direct heat exchange.

Preferably, said heating medium is a stream predominantly containing the target component. For example, said heating medium is provided by the above identified first and second output streams containing the target component.

Similarly, the conditioning step (c) may comprise direct heat exchange with a cooling medium in contact with the adsorbent. Accordingly, all or some of the heat transferred in the conditioning step (c) is transferred by direct heat exchange.

Preferably, said cooling medium is a stream depleted of the target component and preferably containing said at least one side component. For example, said cooling medium is provided by the above identified at least one waste stream depleted of the target component.

According to other embodiments, at least one of the desorption (b) and the conditioning (c) steps comprises indirect heat exchange. In such embodiments, all or some of the heat is transferred by indirect heat exchange.

Further embodiments comprise both direct and indirect heat exchange for said desorption step (b) and/or said conditioning step (c). Accordingly, the heat transferred in step (b) and/or (c) may be partially transferred via direct heat exchange and partially via indirect heat exchange.

Preferably, the desorption temperature ($T_{des}$) is not greater than 250° C., preferably not greater than 200° C. and more preferably not greater than 170° C. Preferably, the conditioning temperature ($T_{con}$) is not greater than 60° C., preferably not greater than 40° C.

Indirect heat exchange denotes that the heat exchange takes place with a surface of separation between the adsorbent and a heat transfer (heating or cooling) medium. In some embodiments, suitable heat exchange bodies such as plates or tubes are immersed in the adsorbent and fed with said medium.

Some embodiments use tubes filled with the adsorbent and a heat exchange medium which is fed outside the tubes, for example in the shell side of an adsorber.

Direct heat exchange has the advantage that the adsorbent is directly contacted with a heating or cooling medium, which avoids the installation of heat exchange bodies, thus reducing the thermal inertia and ensuring a better heat exchange. On the other hand, indirect heat exchange may be preferred because the absence of a contact between the adsorbent and the heating or cooling medium ensures a higher working capacity of the adsorbent and provides more freedom to select the heat exchange fluids.

Reference will be made below to preferred embodiments wherein the process of the invention is carried out in a plurality of reactors, as mentioned above. Embodiment 1 refers to a process comprising one target component-releasing step performed after the desorption step (b); embodiment 2 refers to a process comprising one target component-releasing step performed before the desorption step (b); embodiment 3 refers to a process comprising two target component-releasing steps, one being performed before the desorption step (b) and the other being performed thereafter.

Embodiment 1

The target component-releasing step performed after the desorption step (b) has the effect of releasing a further amount of target component not previously released by the desorption step (b).

Said further amount of target component is released by displacement of non-adsorbed target component by means of the at least one side-component contained in the waste stream(s), and may also be partially released by desorption of an amount of target component not previously desorbed during the desorption step (b). Said waste stream(s) acts as purge stream(s); accordingly and for the sake of brevity, said target component-releasing step will be also referred to as "purge step".

The target component released from said purge step is then recycled to another reactor undergoing an adsorption step, wherein it is recovered. Said recycle takes place after at least partial removal of water contained in the output stream of said purge step. Accordingly, said purge step provides for an increased recovery of the target component. Moreover, the applicant has surprisingly found that said step is made significantly faster due to the energy subtracted by the heat of adsorption, which is beneficial for the productivity of the cycle.

Preferably, said purge step is performed with the aid of at least a portion of said waste stream or at least one of said waste streams which is provided by at least one other reactor of the plurality of reactors.

Said at least a portion of waste stream may be exchanged with or without an intermediate storage in a suitable tank from said at least one other reactor providing the waste stream to the reactor performing said purge step.

More preferably, the waste stream or the portion thereof subjected to said purge step and the at least one water-depleted stream subjected to said adsorption step or to at least one of said adsorption steps are provided by two different reactors. In other words, according to a preferred embodiment, a generic reactor while performing the above sequence of steps, interfaces with at least two other reactors, as it takes the waste stream from one reactor of the plurality and the water-depleted stream from another reactor.

Said waste stream or portion thereof may be supplied to a reactor performing said purge step without any heat exchange, i.e. there is no heat exchanger between the reactors. Alternatively, said waste stream or portion thereof may be cooled before being subjected to the purge step. Preferably, said waste stream or portion thereof is cooled in an external heat exchanger. Said external cooling further reduces the time required for the subsequent conditioning step (c).

Preferably, said waste stream or portion thereof is cooled down to a temperature which is lower than the conditioning temperature ($T_{con}$). Preferably it is cooled down to a temperature in the range 5° C. to 40° C. According to different embodiments it can be cooled to ambient temperature (e.g. 25° C.) or below ambient temperature (e.g. 10° C.).

In a particular embodiment, said process is carried out in a plurality of reactors, wherein: a first reactor performs said purge step providing the aforementioned second output stream, which is subjected to said step (e) producing said water-depleted stream; a second reactor performs said at least one adsorption step providing said at least one waste stream; at least a portion of said water-depleted stream is recycled to said second reactor performing said adsorption step, and at least a portion of said waste stream is supplied to said first reactor performing said purge step, thus forming a closed loop between said first and second reactor.

According to a preferred embodiment, said process is carried out in a plurality of reactors wherein each reactor performs a first adsorption step and a second adsorption step, the latter being carried out after said first adsorption step and before said desorption step (b).

Accordingly, said first adsorption step preferably comprises contacting an input stream of said gaseous mixture with a solid adsorbent and adsorption of target component from said input stream, providing a target component-loaded adsorbent and a first waste stream depleted of the target component. Preferably, during the first adsorption step, the full amount or substantially the full amount of the target component in the input stream is adsorbed. During the first adsorption step at least some water contained in the input stream is adsorbed together with the target component.

The second adsorption step preferably comprises contacting the loaded adsorbent with the water-depleted stream or at least one of the water-depleted streams provided by at least one other reactor of the plurality while performing the step (e), wherein an amount of target component contained in said water-depleted stream is adsorbed and a second waste stream depleted of the target component is produced.

The water-depleted stream is optionally heated before being subjected to said second adsorption step. This optional heat exchange advantageously reduces the time required for the subsequent desorption step (b).

The second adsorption step entails adsorption of some of the target component contained in said water-depleted stream, which causes heat of adsorption to be released. Accordingly, the second adsorption step provides for an increased purity of the recovered target component. In addition, the applicant has surprisingly found that the second adsorption step is made faster due to the heat of adsorption released. This is beneficial especially for the productivity of the cycle.

Preferably, said purge step is performed with the aid of at least a portion of the second waste stream provided by at least one other reactor of said plurality of reactors while performing said second adsorption step.

Preferably, said first waste stream is at least partially used for cooling the adsorbent to the conditioning temperature ($T_{con}$) during the aforementioned step (c). Said at least a portion of the first waste stream is optionally cooled prior to subjection to the conditioning step (c).

According to a particular embodiment, a closed loop is formed between a first reactor performing the purge step and a second reactor performing the second adsorption step.

The embodiments wherein said waste stream and said water-depleted stream are cooled and heated before said purge step and said second adsorption step, respectively, provide a greater flexibility in terms of thermal exchanges.

Embodiment 2

The target component-releasing step performed before the desorption step (b) is also referred to as "further desorption step", because a further amount of target component is released via desorption.

The water-depleted stream resulting from said further desorption step and the subsequent step (e) is preferably recycled to at least one other reactor of said plurality of reactors while performing said at least one adsorption step.

In a particular embodiment, the process of the invention is carried out in a plurality of reactors wherein each reactor performs a single adsorption step. Said adsorption step preferably comprises contacting an input stream of said gaseous mixture with a solid adsorbent and adsorption of target component from said input stream, providing a target component-loaded adsorbent and a waste stream depleted of the target component.

Preferably, the water-depleted stream is mixed with a gaseous mixture feed stream to form the input stream to said at least one other reactor performing the adsorption step (a).

During the adsorption step (a) a portion of said at least one side component is unavoidably adsorbed together with the target component, and said further desorption step is performed in order to release said at least one side component from the adsorbent.

During said further desorption step a portion of the target component is desorbed together with the side component(s), which means that the second output stream released during said further desorption step also contains a portion of the target component. Said further desorption step is controlled in order to desorb a stream predominantly made of the side component(s) adsorbed during the previous adsorption step (a), and in order to reduce the desorption of the target component. To this purpose, said further desorption step is carried out at a suitable low temperature. More in detail, it reaches a temperature which is lower than the temperature ($T_{des}$) reached during the subsequent desorption step (b). More preferably, the temperature of said further desorption step is at least 40° C. lower than the temperature ($T_{des}$) of the subsequent desorption step (b).

The temperature of said further desorption step is selected in such a way to desorb most of the side component(s) avoiding at the same time a significant desorption of the target component. Accordingly, the majority of the target component remains in the adsorbent to be released in the subsequent desorption step (b), and the second output stream of said further desorption step contains a significant amount of the at least one side component. In preferred embodiments, said second output stream contains predominantly said at least one side component.

Preferably, said second output stream contains 20% or more of the side component, more preferably 50% or more of the side component. In typical embodiments it contains 30 to 80%, more preferably 50% to 80% of the side component.

The target component desorbed during said step may be recovered within the same reactor, after an intermediate storage of the relative water-depleted stream in a suitable tank, or within another reactor performing the adsorption step (a), optionally after intermediate storage of the relative water-depleted stream in a suitable tank.

More in detail, according to some embodiments said second output stream is exchanged from a reactor undergoing the further desorption step to another reactor undergoing the adsorption step (a) without an intermediate storage. This means that the further desorption step and the adsorption step (a) of two different reactors exchanging said second output stream are synchronized and while one reactor performs the further desorption step the other reactor performs the adsorption step (a).

In other embodiments, said second output stream is exchanged from a reactor undergoing the further desorption step to another reactor undergoing the adsorption step (a) with an intermediate storage in a suitable tank. This means that the further desorption step and the adsorption step (a) of two different reactors exchanging said gaseous product are not synchronized. The embodiments with said intermediate storage provide a greater flexibility since the duration of said steps of the two reactors may be different.

Said further desorption step may comprise indirect heat exchange or direct heat exchange with a heating medium in contact with the adsorbent. Preferably, said heating medium is a stream containing predominantly the target component.

Embodiment 3

The process is preferably carried out in a plurality of reactors wherein each reactor performs a first adsorption step and a second adsorption step as already described above for embodiment 1.

According to this embodiment, the process of the invention is carried out in a plurality of reactors wherein each reactor performs a target component-releasing step before the main desorption as in embodiment 2 (that is a further desorption step), providing a first water-depleted stream, and a target component-releasing step thereafter as in embodiment 1 (that is a purge step), providing a second water-depleted stream. Preferably, said first water-depleted stream is recycled to said first adsorption step and said second water-depleted stream is recycled to said second adsorption step.

The target component released during one or both of said target component-releasing steps can be recovered within the same reactor, after an intermediate storage, or within another reactor undergoing adsorption, optionally after an intermediate storage in a suitable tank.

The time duration of the target component-releasing step performed before the desorption step (b) is preferably from 3 to 10 times the time duration of the second adsorption step, more preferably six times the duration of the second adsorption step. Moreover, the time duration of the desorption step (b) is preferably from 15 to 70 times the time duration of the second adsorption step. The time duration of the conditioning step (c) is preferably from 10 to 50 times the time duration of the target component-releasing step before the desorption step (b).

The above time durations allow to obtain high values of purity and recovery, as well as high productivity and low energy consumption.

Indeed, a shorter time duration of the desorption (b) or conditioning (c) step would compromise the CO2 purity and CO2 recovery. On the other hand, a longer time duration would be beneficial in terms of purity and recovery, but detrimental for the productivity of the cycle.

A shorter time duration of the second adsorption step would instead decrease the energy consumption and improve the productivity, but would compromise the CO2 purity. On the other hand, a longer time duration would increase the CO2 purity, but worsen the productivity and increase the energy demand.

Hence, the time durations found by the applicant represent close-to-optimal values.

According to a preferred application of the invention, the target component is carbon dioxide. Preferably, said at least one side component includes nitrogen.

Preferably, said gaseous mixture is a flue gas. In preferred applications of the invention the gaseous mixture may be for example a flue gas of any of: an ammonia plant, a methanol plant, a urea plant, a fossil fuel fired power plant.

Another object of the present invention is the use of the above described process for treating a flue gas of an ammonia or methanol or urea plant or of a fossil fuel fired power plant. In case of methanol or urea plant, some embodiments include the use of recovered CO2 as a feedstock.

The present invention has several advantages.

First of all, the water contained in the gaseous mixture feeding the process does not accumulate thanks to its removal through step (e) from some internal streams which are properly recycled to adsorption as water-depleted streams containing the target component.

Furthermore, recycling the water-depleted streams containing the target component to adsorption and the waste streams depleted of the target component to the aforementioned purge step improve the performance of a TSA process. In particular, the water-depleted streams enrich the adsorbent material with the target component (e.g. CO2) before regeneration occurring during the desorption step, thus improving both purity and recovery of the target component. The waste streams "clean" the adsorbent material by displacing and, optionally, desorbing the target component before conditioning, so that recovery is increased and the adsorbent capacity for the target component is greater in the following cycle.

Furthermore, separation of water via condensation is particularly advantageous because it prevents the water from condensing over the adsorbent material, which would occur when recycling a stream to an adsorbent lower in temperature. This is even more advantageous considering that the adsorption preferably takes place at a relatively low temperature, i.e. not greater than 60° C. The removal of water from the internal recycle increases the effective capacity of the adsorbent for the target component.

Another advantage is the relatively low regeneration temperature (also referred to above as desorption temperature $T_{des}$), which is preferably lower than 200° C. This is due to the fact that the adsorbent material contains a marginal quantity of water; larger quantities would otherwise require a higher desorption temperature (e.g. 300° C.).

The separation of water via condensation is also advantageous because it is carried out on process streams having a relatively high dew point (i.e. streams leaving the aforementioned target component-releasing steps).

In addition, condensation of water is an extremely simple technique and does not entail any significant energy consumption, contrary to regeneration of the adsorbent.

Thanks to the process of the invention, no additional apparatus for removal of water are required, such as dryers which involve additional costs and entail high consumption of mechanical and thermal energy.

The present invention also allows to operate several reactors in a synchronous manner, with the operating cycles of the different reactors properly shifted in time. This is advantageous for most applications, wherein a continuous operation is desired.

Cycle scheduling consists in determining the number, sequence and duration of the cycle steps, including any necessary idle times, and the number and connections of reactors required to run a continuous operation. This has an effect on the effective productivity of the cycle, defined as the amount of produced target compound per unit time and adsorbent mass.

The schedule will depend on the imposed constraints, e.g. continuous feed, continuous production, synchronization of the steps. A further constraint that may be considered for the TSA cycle of the invention is that of having a reactor starting the conditioning step (c) at the same time when another reactor starts the desorption step (b), thus allowing the reuse of a hot thermofluid present in the former reactor to heat up the latter reactor (so called temperature equalization).

For CO2 capture from flue gases, the scheduling shall ensure the possibility to treat a continuous feed, and/or to continuously produce a target component stream at all times.

The advantages of the invention will be elucidated with the help of the following description of preferred and non-limiting embodiments.

DETAILED DESCRIPTION OF PREFERRED EMBODIMENTS

Figure 1:
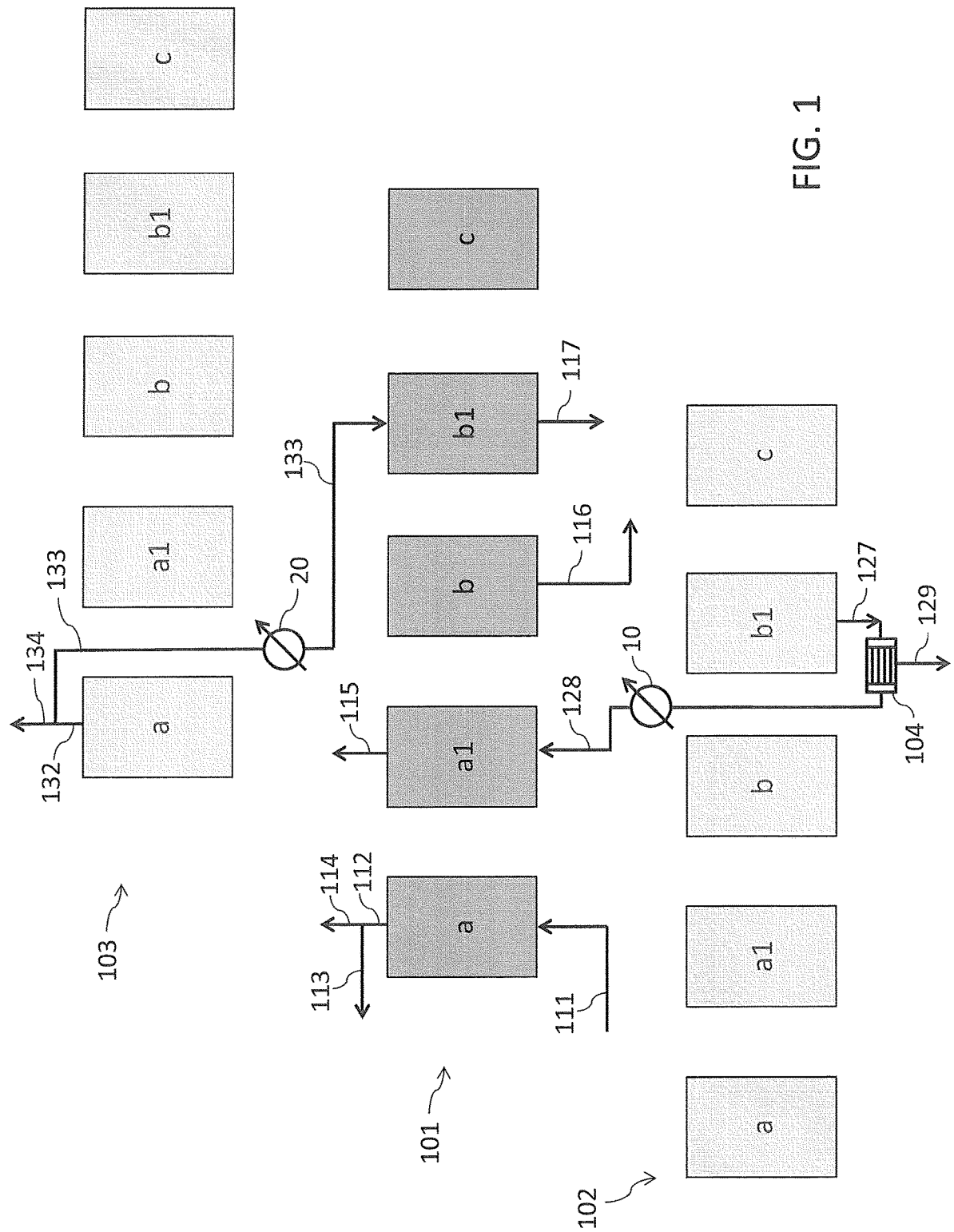
FIGS. 1 to 5 are block diagrams of temperature swing adsorption processes for removing the carbon dioxide from a flue gas, according to various embodiments of the invention.

Embodiment of FIG. 1

Referring to FIG. 1, the process of the invention is carried out in a plurality of reactors, for example including reactors 101, 102, 103. Each reactor 101-103 contains a fixed bed of an adsorbent for a target component, for example zeolite 13X for adsorption of $CO_2$.

Each reactor performs a number of steps, namely: a first adsorption step (a), a second adsorption step (a1), a desorption step (b), a purge step (b1), a conditioning step (c) and a condensation step. The reactors are interconnected and, during some of said process steps, a reactor may exchange one or more stream(s) with one or more other reactor(s). In FIG. 1, the blocks (a), (a1), (b), (b1), (c) denote the reactors 101, 102, 103 while performing said process steps.

During the first adsorption step (a), a gas to be treated, for example a flue gas, is admitted to the reactor and the target component is adsorbed, resulting in a waste stream and partially loading the adsorbent with the target component. During the second adsorption step (a1), the adsorbent is contacted with a stream rich of the target component which is obtained by subjecting to condensation the effluent of another reactor performing the purge step (b1). As a consequence, a further amount of the target component is adsorbed and the one or more side components are expelled, thus generating another waste stream. During the desorption step (b), the adsorbent is heated by direct or indirect heat exchange, resulting in desorption of the target component and partial regeneration of the adsorbent. During the purge step (b1), the partially regenerated adsorbent is contacted by at least a portion of a waste stream (mainly containing the one or more side components) taken from another reactor while performing the first adsorption step (a). Step (c) is the conditioning step which brings the adsorbent back to the adsorption temperature in order to start again the cycle.

Said steps and said interactions between the reactors will be described with a greater detail with reference to the working cycle of reactor 101.

First Adsorption Step (a)

A flue gas 111 coming from a combustion process and containing predominantly carbon dioxide ($CO_2$), nitrogen ($N_2$) and water ($H_2O$) is supplied to the reactor 101, where $CO_2$ and some water are adsorbed over the zeolite bed of the reactor, having a greater affinity with said adsorbent compared to nitrogen.

As a result, step (a) provides a $CO_2$-loaded adsorbent and a first waste stream 112 containing predominantly $N_2$. A portion 113 of said waste stream 112 can be used in another reactor (for example in reactor 103) while performing the purge step (b1) taking place before the desorption step (b), as will be explained below. The remaining portion 114 of the waste stream 112 is exported and can be vented or used for a further scope if appropriate. For example in an ammonia plant, said stream 114, which is rich in nitrogen, can be used for the synthesis of ammonia.

Preferably, the first adsorption step (a) takes place at ambient temperature, for example at a temperature in the range 15 to 30° C. Preferably said step (a) is carried out upflow, which means that the flue gas 111 is supplied from the bottom of the reactor 101 and the waste stream 112 leaves the reactor 101 from the top.

Second Adsorption Step (a1)

The reactor 101 receives a gaseous $CO_2$-rich stream 128. Said stream 128 is obtained by subjecting the output stream 127 of another reactor (for example reactor 102) while performing the purge step (b1) to a condensation step in a dedicated condenser 104 for removal of water 129. Therefore, said $CO_2$-rich stream 128 is deprived of water also and is referred to as water-depleted stream.

Said water-depleted stream 128 is fed to the bottom of the reactor 101, meaning that step (a1) is carried out in the same flow direction as step (a).

Said water-depleted stream 128 is optionally heated in an external heat exchanger 10 prior to admission to said reactor 101. For example said stream 126 is optionally heated to a temperature of 343 K (70° C.).

During said step (a1), some of the carbon dioxide contained in the $CO_2$-rich stream 128 is adsorbed over the adsorbent bed, which is already partially loaded with $CO_2$ as a consequence of the first adsorption step (a); a second waste stream 115 mainly containing $N_2$ is obtained, which is exported and can be vented or used in the process, similarly to the above mentioned stream 112.

In some embodiments, the second adsorption step (a1) of reactor 101 and the purge step (b1) of the reactor 102 are synchronized, which means that the water-depleted stream 128 leaving the condenser 104 at the outlet of the reactor 102 passes into the reactor 101 without an intermediate storage. In other embodiments, said water-depleted stream 128 is stored in a suitable tank (not shown) and subsequently introduced into the reactor 101 for the above described step (a1). The latter embodiment with intermediate storage may provide a greater flexibility since the duration of steps (a1) and (b1) of the two reactors may be different.

Desorption Step (b)

The $CO_2$-loaded adsorbent is heated, for example to 420 K (147° C.); as a consequence, $CO_2$ is desorbed producing a current 116 of $CO_2$ of a high purity and the adsorbent of the reactor 101 is partially regenerated.

The desorption step (b) can be performed either by means of indirect heat exchange or direct heat exchange.

In case of indirect heat exchange, preferably one of the reactor ends is kept open while the other is kept closed, meaning that it is a semi-open heating step.

In case of direct heat exchange, a hot regeneration medium is supplied to the reactor for direct contact with the adsorbent. Preferably, both ends of the reactor 101 are kept open and said regeneration medium flows opposite with respect to steps (a) and (a1), namely from the top to the bottom. Preferably said regeneration medium is made predominantly of $CO_2$ (i.e. of the target component).

Purge Step (b1)

The adsorbent in the reactor 101 is purged with a portion 133 of the waste stream 132 resulting from the first adsorption step (a) of another reactor (for example of reactor 103). Said waste stream 132 is similar in composition to the previously described stream 112 obtained from the reactor 101.

Said portion 133 is preferably fed to the reactor 101 from the top, meaning that step (b1) is carried out in the opposite flow direction with respect to steps (a) and (a1).

Said waste stream 133 is optionally cooled in an external heat exchanger 20 prior to admission into the reactor 101. For example the waste stream 133 is cooled to a temperature of 283 K (10° C.).

During said step (b1), the waste stream 133 "cleans" the adsorbent by displacing at least a portion of the non-adsorbed CO2 from the reactor (and optionally desorbing a further portion of CO2), thus forming a $CO_2$-rich stream 117, so that the recovery is increased. Said $CO_2$-rich stream 117 can be used in the second adsorption step (a1) of another reactor, in the same manner as the $CO_2$-rich stream 127 previously described.

In some embodiments, the first adsorption step (a) of reactor 103, the condensation step and the purge step (b1) of reactor 101 are synchronized, so that the waste stream 133 leaving the reactor 103 passes into the reactor 101 without an intermediate storage. In other embodiments, a storage tank for said stream 133 is provided.

Conditioning Step (c)

The adsorbent is cooled down to the adsorption temperature in order to restart the cycle. Said conditioning step (c) can be carried out either at constant pressure, where one end of the reactor 101 is kept open and the other end is kept closed, or under slightly vacuum conditions, where both ends of the reactor 101 are closed.

The other reactors, such as reactors 102 and 103, perform the same steps.

Figure 2:
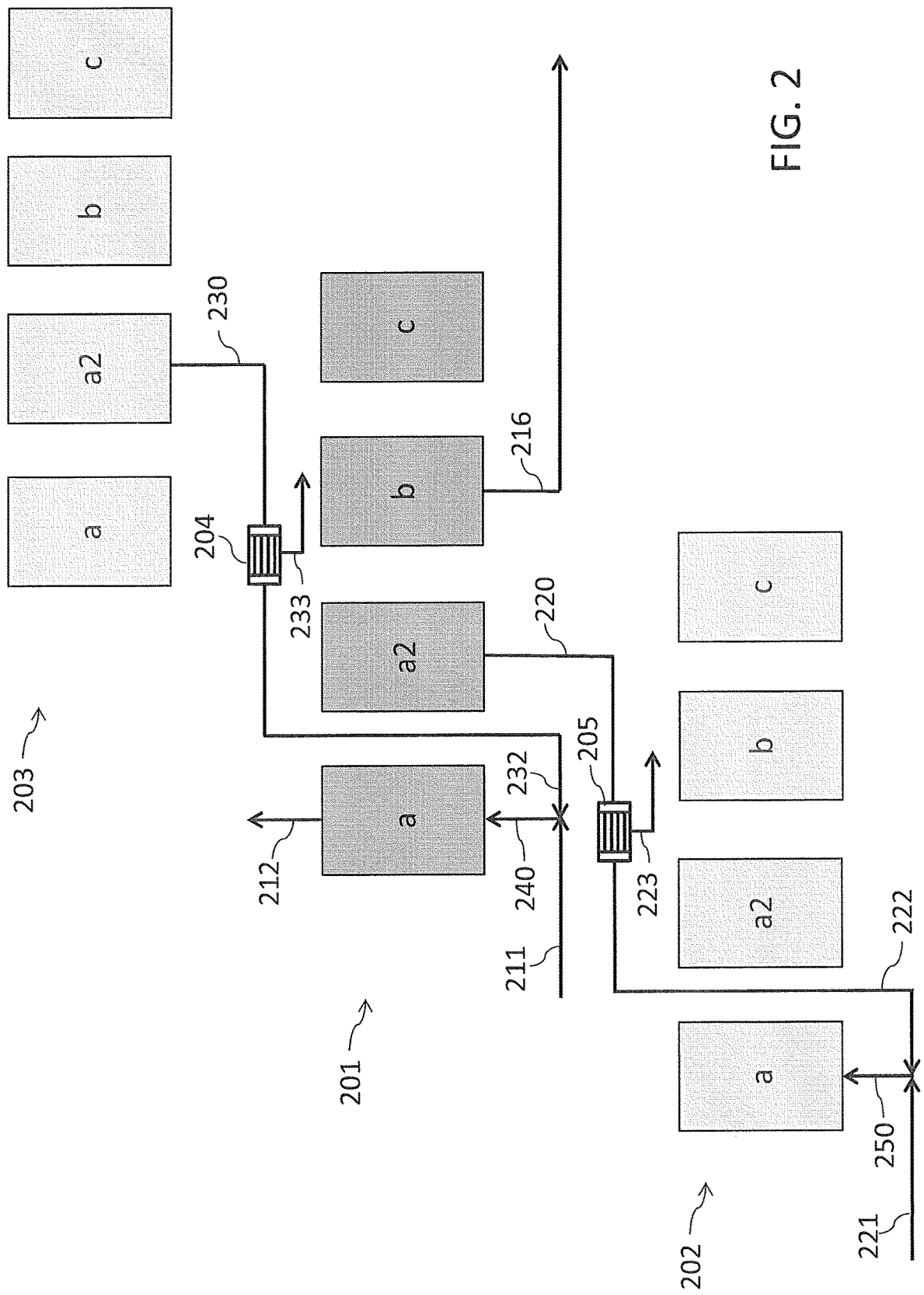

Embodiment of FIG. 2

Referring to FIG. 2, the process of the invention is carried out in a plurality of reactors, for example including reactors 201, 202, 203. Each reactor 201-203 contains a fixed bed of an adsorbent for a target component, for example zeolite 13X for adsorption of CO2.

Each reactor performs a number of steps, namely: an adsorption step (a), a first desorption step (a2), a second and main desorption step (b), a conditioning step (c) and a condensation step. In FIG. 2, the blocks (a), (a2), (b), (c) denote the reactors 201, 202, 203 while performing said process steps.

During the adsorption step (a), a gas to be treated, for example a flue gas, is admitted to the reactor and the target component is preferentially adsorbed, resulting in a waste stream and loading the adsorbent with the target component. During the first desorption step (a2), the adsorbent is slightly heated in order to remove the one or more side components from the adsorbent, which also results in desorption of some of the target component. During the second (main) desorption step (b), the adsorbent is heated by direct or indirect heat exchange, resulting in desorption of the target component and regeneration of the adsorbent. During the conditioning step (c), the temperature of the adsorbent is lowered in order to start again the cycle with step (a).

The above steps are now elucidated with reference to the reactor 201 and to a preferred embodiment.

Adsorption Step (a)

A combustion flue gas 211 predominantly containing carbon dioxide (CO2), nitrogen (N2) and water (H2O) is mixed with a gaseous product 232 predominantly containing N2 and a small amount of CO2, and the resulting mixture 240 is supplied to the reactor 201. Said gaseous product 232 is obtained by subjecting the output stream 230 of another reactor of the plurality (for example reactor 203) performing said first desorption step (a2) to a condensation step in a dedicated condenser 204 for removal of water 233. Said stream 238 is also referred to as water-depleted stream.

During the adsorption step (a), CO2 and some water are adsorbed over the zeolite bed of the reactor 201 providing a CO2-loaded adsorbent, and a CO2-depleted effluent 212 predominantly containing N2 is exported which can be vented or used for a further scope if appropriate. For example, in an ammonia plant, said stream 212, which is rich in nitrogen, can be used for the synthesis of ammonia. A minor portion of N2 is also adsorbed over the zeolite bed, such portion being much smaller than the adsorbed CO2.

In some embodiments, the adsorption step (a) of the reactor 201, the condensation step and the first desorption step (a2) of the reactor 203 are synchronized, which means that the gaseous product 232 from the condenser 204 passes into the reactor 201 without an intermediate storage. In other embodiments, said gaseous product 232 is stored in a suitable tank outside the reactor 203 and subsequently introduced into the reactor 201 undergoing step (a).

First Desorption Step (a2)

The CO2-loaded adsorbent contained in the reactor 201 is heated to a selected temperature lower than the temperature of the subsequent main desorption step (b). For example, the temperature reached by the adsorbent during said first desorption step (a2) is comprised between 360 and 380 K (87-107° C.).

During said step (a2), some nitrogen, water and a small amount of CO2 are desorbed providing a gaseous product 220. During said step (a2), the pressure is kept constant and only the bottom end of the reactor is kept open.

The so obtained gaseous product 220 is subsequently subjected to a condensation step in a dedicated condenser 205 providing a water-depleted stream 222 and water 223. Said stream 222 is then mixed with the flue gas feed of the reactor 202, in the same manner as the gaseous product 232 previously described, in order to recover the CO2 contained therein. For example, said gaseous product 222 is mixed with a flue gas 221 admitted to a second reactor 202, to form a mixture 250.

In some embodiments, the gaseous product 222 can be subjected to adsorption step (a) in the same reactor 201. In a such a case, said gaseous product 222 is stored in a suitable tank (not shown) before being recycled to the reactor.

Second (Main) Desorption Step (b) and Conditioning Step (c)

The adsorbent still loaded with CO2 is heated, for example to 420 K (147° C.); as a consequence, the CO2 is desorbed producing a current 216 of CO2 of a high purity and the adsorbent of the reactor 201 is regenerated.

The regenerated adsorbent is subsequently cooled down to the adsorption temperature, for example to the ambient temperature in order to restart the cycle.

Figure 3:
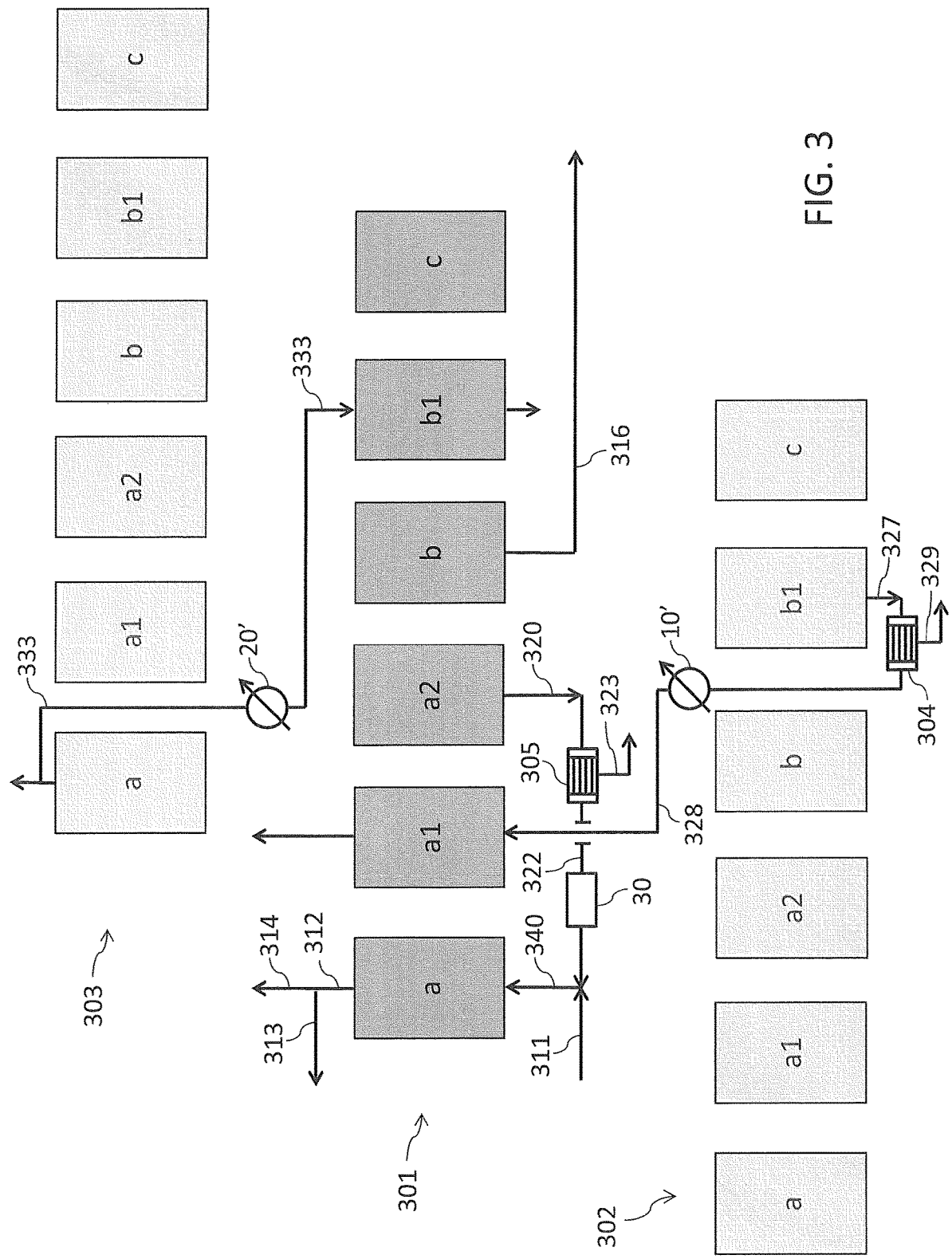

Embodiment of FIG. 3

Referring to FIG. 3, the process of the invention is carried out in a plurality of reactors, for example including reactors 301, 302, 303. Each reactor 301-303 contains a fixed bed of an adsorbent for a target component, for example zeolite 13X for adsorption of $CO_2$.

Each reactor performs a sequence of steps which is the same sequence as the first embodiment, with the addition of a further desorption step (a2) which is the same as the second embodiment. Said further desorption step (a2) is carried out after the second adsorption step (a1) and before the desorption step (b). For the sake of simplicity, said further desorption step (a2) and said desorption step (b) will be also referred to as first desorption step and second (main) desorption step (b), respectively.

Since these steps are in common to the first and second embodiments, they are not described in detail for the sake of brevity.

Combining steps (a1) and (b1) with a further desorption step (a2) gives rise to a synergy, allowing to obtain high recovery and high purity of step (a2) and low energy consumption of steps (a1) and (b1).

Referring to a reactor 301, a gas mixture 311 containing predominantly carbon dioxide ($CO_2$), nitrogen ($N_2$) and water ($H_2O$) is mixed with a gaseous product 322 predominantly containing $N_2$ and a small amount of $CO_2$ and also containing residual water, to provide a gaseous input stream 340. Said gaseous product 322 is obtained from a condensation step carried out on the effluent 320 of the first desorption step (a2). Said condensation step takes place in a condenser 305 and also separates water 323. Accordingly said gaseous product 322 contains less water than the effluent 320 and is also referred to as water-depleted stream.

Said input stream 340 is supplied to the reactor 301 for the adsorption step (a) wherein a waste stream 312 is produced and the adsorbent is loaded with $CO_2$ and some water. A portion 313 of the waste stream can be used in the purge step (b1) of another reactor and the remaining portion 314 is exported or vented.

Then, the reactor 301 undergoes the second adsorption step (a1) with the help of a water-depleted stream 328, which is obtained by subjecting the output stream 327 of another reactor of the plurality (for example reactor 302) performing the purge step (b1) to a condensation step in a dedicated condenser 304 for removal of water 329. Said water-depleted stream is optionally subjected to heating in an exchanger 10' before being supplied to the reactor 301.

Then, the reactor 301 undergoes the first desorption step (a2), during which the $CO_2$-loaded adsorbent contained in the reactor 301 is further heated. The temperature reached by the adsorbent during said step (a2) is lower than the temperature reached during the subsequent main desorption step (b). For example, the adsorbent is heated to a temperature ranging between 360 and 380 K (i.e. between 87 and 107° C.) during said step (a2).

During said step (a2), the nitrogen, the water and a small amount of $CO_2$ are desorbed providing the gaseous product 320. During said step (a2), only the bottom end of the reactor is kept open.

Said gaseous product 320 is subjected to condensation in the condenser 305 providing the aforementioned water-depleted stream 322.

In some embodiments, said water-depleted stream 322 is stored in a tank 30 and subsequently mixed with the flue gas 311 to provide the gaseous stream 340 feeding the reactor 301 undergoing the first adsorption step (a), in order to recover the $CO_2$ contained therein. In other embodiments (not shown), said water-depleted stream 322 is mixed with the flue gas feed of another reactor, for example of reactor 302 or 303.

After the first desorption step (a2), the reactor 201 undergoes the sequence of the second (main) desorption (b), purge (b1) and conditioning (c), which are equivalent to the same steps of the first embodiment. In particular, the purge step (b1) is carried out with the help of a waste stream 333 taken from another reactor, e.g. from reactor 303, optionally with intermediate cooling in a heat exchanger 20'. The main desorption step (b) releases a $CO_2$ stream 316.

The other reactors, such as reactors 302 and 303, perform the same steps.

Figure 4:
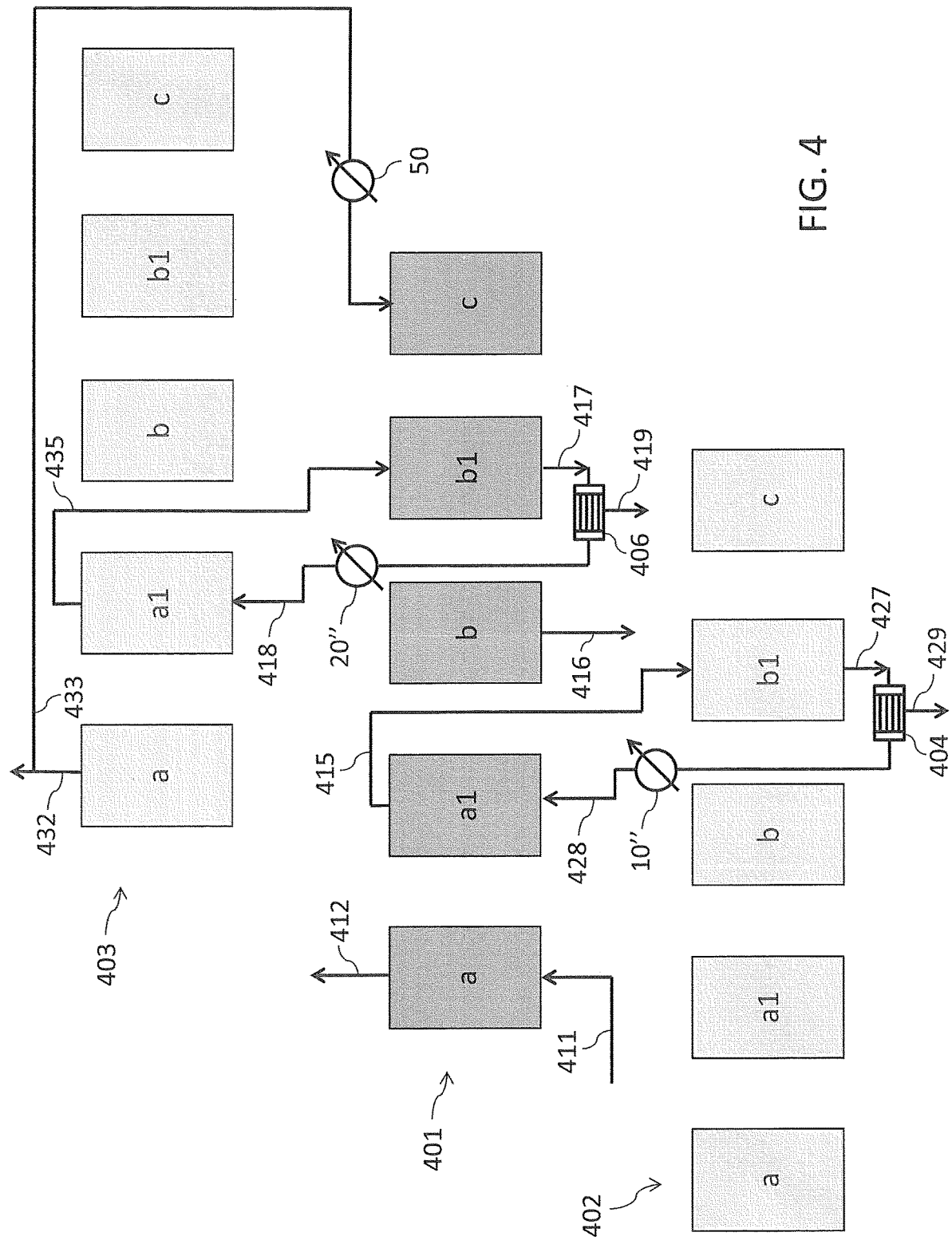

Embodiment of FIG. 4

Referring to FIG. 4, the process of the invention is carried out in a plurality of reactors, for example including reactors

401, 402, 403. Each reactor 401-403 contains a fixed bed of an adsorbent for a target component, for example zeolite 13X for adsorption of $CO_2$.

Each reactor performs a number of steps, which is the same sequence as the first embodiment, with the difference that reactors undergoing the purge step (b1) are supplied with the effluent waste stream of at least another reactor performing the second adsorption step (a1), the latter being fed with the water-depleted stream, thus forming a closed loop.

Since these steps are in common to the first embodiments, they are not described in detail for the sake of brevity.

During the first adsorption step (a), a wet flue gas 411 predominantly containing CO2, N2 and water is admitted to the reactor 401, wherein CO2 and some water are adsorbed, resulting in a first waste stream 412 and partially loading the adsorbent with CO2.

During the second adsorption step (a1), the adsorbent is contacted with a CO2-rich stream 428. Said stream 428 is obtained by subjecting the output stream 427 of another reactor of the plurality (for example reactor 402) performing the purge step (b1) to a condensation step in a dedicated condenser 404 for removal of water 429, and optionally by subjecting the water-depleted stream 428 to a heat exchanger 10". As a consequence, a further amount of CO2 is adsorbed and N2 is expelled, thus generating a second waste stream 415. Said second waste stream is recycled to said another reactor 402 while performing said step (b1), thus forming a closed loop between reactors 401 and 402.

During the desorption step (b), the adsorbent is heated by direct or indirect heat exchange, resulting in desorption of CO2 as stream 416 and regeneration of the adsorbent.

The purge step (b1) is made with the help of the second waste stream 435 taken from step (a1) of another reactor (for example of the reactor 403). The effluent of said step (b1) is a CO2-rich stream 417, which is supplied to a condenser 406 for removal of water 419 and the resulting water-depleted stream 418 is recycled to step (a1) of said another reactor via optional passage through heat exchanger 20", thus forming a closed loop between reactors 401 and 403.

The conditioning step (c) is made with the help of at least a portion 433 of the first waste stream 432 (mainly containing N2) taken from the adsorption step (a) of another reactor (for example from the reactor 403) and optionally passing through a heat exchanger 50. Said step (c) brings the adsorbent back to the adsorption temperature in order to start again the cycle with step (a).

Figure 5:
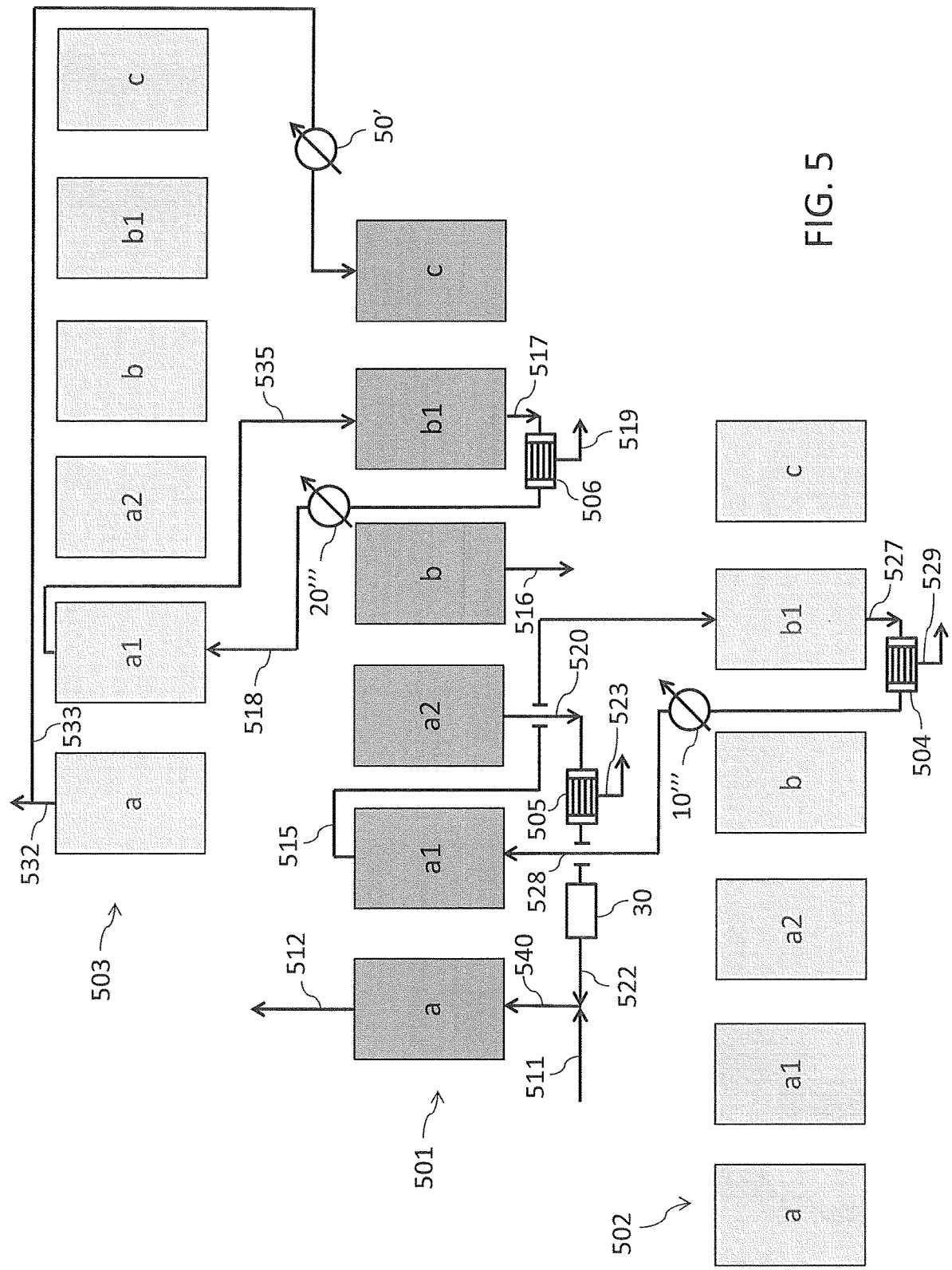

Embodiment of FIG. 5

Referring to FIG. 5, the process of the invention is carried out in a plurality of reactors, for example including reactors 501, 502, 503. Each reactor 501-503 contains a fixed bed of an adsorbent for a target component, for example zeolite 13X for adsorption of $CO_2$.

Each reactor performs a sequence of steps which is the same sequence as the third embodiment, with the difference that reactors undergoing the purge step (b1) are supplied with the effluent waste stream of at least another reactor performing the second adsorption step (a1) and the latter is fed with the water-depleted stream as in the fourth embodiment, thus forming a closed loop between two reactors of the plurality.

Referring to a reactor 501, a gas mixture 511 containing predominantly $CO_2$, $N_2$ and water is mixed with a gaseous product 522 predominantly containing $N_2$ and a small amount of $CO_2$ and also containing residual water, to provide a gaseous input stream 540. Said gaseous product 522 is obtained from a condensation step carried out on the effluent 520 of the first desorption step (a2), which also separates condensed water 523. Said condensation step takes place in the condenser 505 and said gaseous product 522 is also referred to as water-depleted stream.

Said input stream 540 is supplied to the reactor 501 for the adsorption step (a) wherein a waste stream 512 is produced and the adsorbent is loaded with $CO_2$.

Then, the reactor 501 undergoes the second adsorption step (a1) and the adsorbent is contacted with a CO2-rich stream 528. Said stream 528 is obtained by subjecting the output stream 527 of another reactor of the plurality (for example reactor 302) performing said purge step (b1) to a condensation step in a dedicated condenser 504 for removal of water 529, optionally with intermediate heating in the exchanger 10'''. As a consequence, a further amount of CO2 is adsorbed and N2 is expelled, thus generating a second waste stream 515. Said second waste stream 515 is recycled to said another reactor 502 while performing said step (b1), thus forming a closed loop between reactors 501 and 502.

Then, the reactor 501 undergoes the first desorption step (a2), during which the $CO_2$-loaded adsorbent contained in the reactor 501 is further heated. During said step (a2), the nitrogen, the water and a small amount of $CO_2$ are desorbed providing the gaseous product 520. Said gaseous product 520 is subjected to condensation in the condenser 505 providing the aforementioned water-depleted stream 522.

In some embodiments, said water-depleted stream 522 is stored in a tank 30 and subsequently mixed with the flue gas 511 to provide the gaseous stream 540 feeding the reactor 501 undergoing the adsorption step (a), in order to recover the $CO_2$ contained therein. In other embodiments (not shown), said water-depleted stream 522 is mixed with the flue gas feed of another reactor, for example of reactor 502 or 503 (not shown).

After the first desorption step (a2), the reactor 201 undergoes the sequence of the second (main) desorption (b), purge (b1) and conditioning (c), which are equivalent to the same steps of the forth embodiment.

In particular, the purge step (b1) is made with the help of the second waste stream 535 taken from step (a1) of another reactor (for example of the reactor 503). The effluent of said step (b1) is a CO2-rich stream 517, which is supplied to a condenser 506 for removal of water 519 and the resulting water-depleted stream 518 is recycled to step (a1) of said another reactor via optional passage through heat exchanger 20'''.

The conditioning step (c) is made with the help of at least a portion 533 of the first waste stream 532 (mainly containing N2) taken from the adsorption step (a) of another reactor (for example from the reactor 503) and optionally passing through a heat exchanger 50'. Said step (c) brings the adsorbent back to the adsorption temperature in order to start again the cycle with step (a).

The invention claimed is:

1. A temperature swing adsorption process for removing a target component from a gaseous mixture containing water and at least one side component besides the target component, said temperature swing process comprising:
   (a) at least one adsorption step, comprising adsorption of target component over a solid adsorbent, providing a target component-loaded adsorbent and at least one waste stream depleted of the target component;
   (b) a desorption step, comprising heating of said target component-loaded adsorbent to a desorption temperature and desorption of an amount of target component, providing an at least partially regenerated adsorbent and a first output stream containing the desorbed target component;

(c) a conditioning step, comprising cooling of said at least partially regenerated adsorbent to a conditioning temperature;

(d) at least one target component-releasing step bringing the solid adsorbent to a temperature lower than said desorption temperature and providing at least one second output stream containing an amount of the target component and containing water;

(e) separating water from said second output stream(s), producing at least one water-depleted stream; and (f) subjecting said water-depleted stream(s) to said adsorption step or to at least one of said adsorption steps;

wherein said at least one target component-releasing step is performed before or after said desorption step (b); and wherein said step (e) comprises cooling of said second output stream(s) to condense at least a portion of the water contained therein and also comprises separation of the condensed water, obtaining said water-depleted stream(s).

2. The temperature swing process of claim 1, wherein said target component-releasing step is performed before the desorption step (b) and comprises heating of the target component-loaded adsorbent up to a temperature which is lower than said desorption temperature.

3. The temperature swing process of claim 1, wherein said target component-releasing step is performed after the desorption step (b) and comprises cooling of said at least partially regenerated adsorbent to a temperature which is preferably higher than said conditioning temperature, said cooling taking place with the aid of at least a portion of said waste stream or at least one of said waste streams, which is cooled prior to be subjected to said target component-releasing step(s).

4. The temperature swing process of claim 1, wherein said target component-releasing step includes more than one of said target component-releasing step, wherein one of them is performed before said desorption step (b) and another one is performed thereafter with the aid of at least a portion of said waste stream or at least one of said waste streams, which is optionally cooled prior to be subjected thereto.

5. The temperature swing process of claim 1, wherein said temperature swing process is carried out in a plurality of reactors containing an adsorbent and each reactor of the plurality of reactors performing said steps (a) to (f).

6. The temperature swing process of claim 5, wherein said water-depleted stream or at least one of said water-depleted streams provided by one reactor is subjected to at least one other reactor of the plurality while performing said adsorption step (a) or one of said adsorption steps.

7. The temperature swing process of claim 6, wherein said water-depleted stream or at least one of said water-depleted streams is subjected with or without an intermediate storage in a suitable tank to said at least one other reactor performing said adsorption step (a) or one of said adsorption steps.

8. The temperature swing process of claim 6, wherein said target component-releasing step or at least one of said target component-releasing steps being performed after the desorption step (b) and comprising cooling of said at least partially regenerated adsorbent to a temperature which is higher than said conditioning temperature with the aid of at least a portion of said waste stream or at least one of said waste streams which is provided by at least one other reactor of said plurality.

9. The temperature swing process of claim 8, wherein said at least a portion of waste stream is exchanged with or without an intermediate storage in a tank from said at least one other reactor to the reactor undergoing said target component-releasing step (d).

10. The temperature swing process of claim 8, wherein the waste stream or at least one of the waste streams subjected to said target component-releasing step and the water-depleted stream or at least one of the water-depleted streams subjected to said adsorption step or to at least one of said adsorption steps are provided by two different reactors.

11. The temperature swing process of claim 10, wherein:
a first reactor performs said target component-releasing step before the desorption step (b) providing the second output stream, which is subjected to said step (e) producing said water-depleted stream;
a second reactor performs said at least one adsorption step providing said at least one waste stream; and
at least a portion of said water-depleted stream is subjected to said second reactor performing the adsorption step, and at least a portion of said waste stream is used for the target component-releasing step (d) of said first reactor, thus forming a closed loop between said first and second reactor.

12. The temperature swing process of claim 11, wherein each reactor of said plurality performs a first adsorption step and a second adsorption step, said second adsorption step being carried out after said first adsorption step and before said desorption step (b);
said first adsorption step comprising contacting an input stream of said gaseous mixture with a solid adsorbent and adsorption of target component from said input stream, providing a target component-loaded adsorbent and a first waste stream depleted of the target component;
said second adsorption step comprising contacting said loaded adsorbent with the water-depleted stream or at least one of the water-depleted streams provided by at least one other reactor of said plurality of reactors while performing said step (e), wherein an amount of the target component contained in said water-depleted stream is adsorbed and a second waste stream depleted of the target component is produced.

13. The temperature swing process of claim 12, wherein said target component-releasing step performed after the desorption step (b) is carried out with the aid of at least a portion of the second waste stream provided by at least one other reactor of said plurality of reactors while performing said second adsorption step.

14. The temperature swing process of claim 13, wherein said conditioning step (c) is carried out by at least a portion of the first waste stream provided by said at least one other reactor of said plurality of reactors while performing said first adsorption step (a), said at least a portion of the first waste stream being cooled prior to subjection to said conditioning step (c).

15. The temperature swing process of claim 14, wherein each reactor of the plurality of reactors additionally performs one target component-releasing step before the desorption step (b), and provides a first water-depleted stream resulting from the target component-releasing step performed before the step (b) and a second water-depleted stream resulting from the target component-releasing step performed after the step (b), said first stream being supplied to a reactor performing said first adsorption step and said second stream being supplied to a reactor performing said second adsorption step.

16. The temperature swing process of claim 1, wherein the desorption temperature is not greater than 250° C.

17. The temperature swing process of claim 16, wherein the desorption temperature is not greater than 200° C.

18. The temperature swing process of claim 17, wherein the desorption temperature is not greater than 170° C.

19. The temperature swing process of claim 1, wherein the conditioning temperature is not greater than 60° C.

20. The temperature swing process of claim 1, wherein said target component includes carbon dioxide.

21. The temperature swing process of claim 1 wherein said gaseous mixture includes a flue gas.

22. The temperature swing process of claim 21 wherein said flue gas includes a flue gas of any of: an ammonia plant, a methanol plant, a urea plant, or a fossil fuel fired power plant.

\* \* \* \* \*